Figure 4:
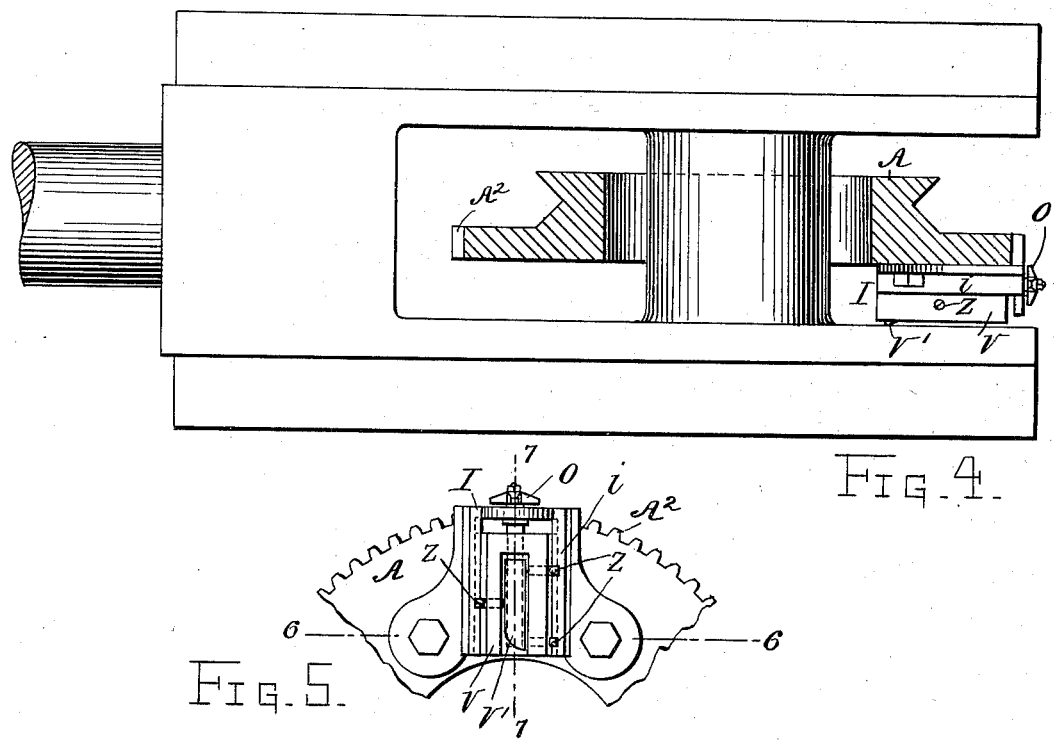

No. 609,060. Patented Aug. 16, 1898.
W. M. WALLACE.
PIN TURNING MACHINE.
(Application filed Jan. 25, 1898.)
(No Model.) 3 Sheets—Sheet 1.
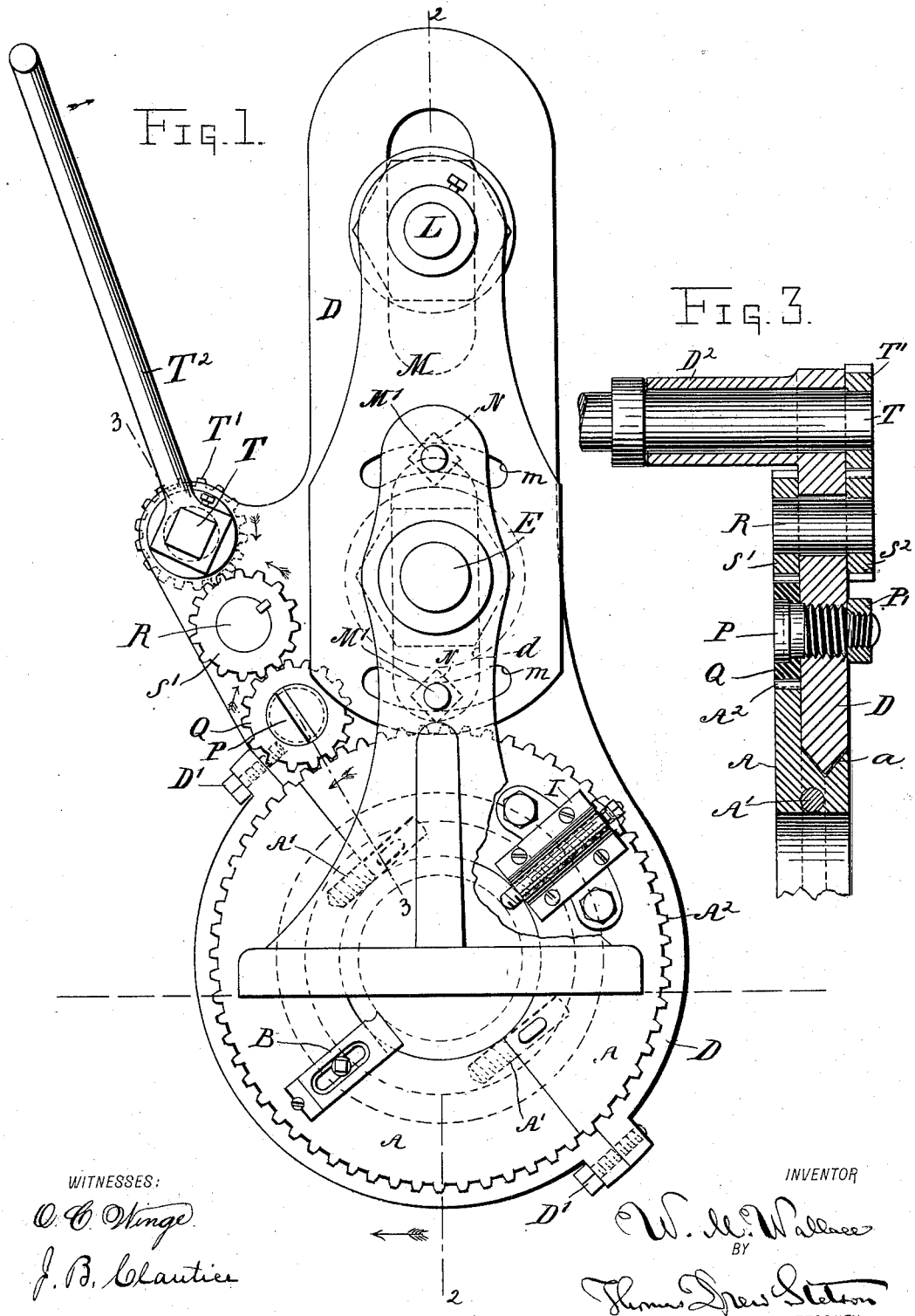
WITNESSES:
INVENTOR
W. M. Wallace
BY
Thomas Drew Stetson
ATTORNEY

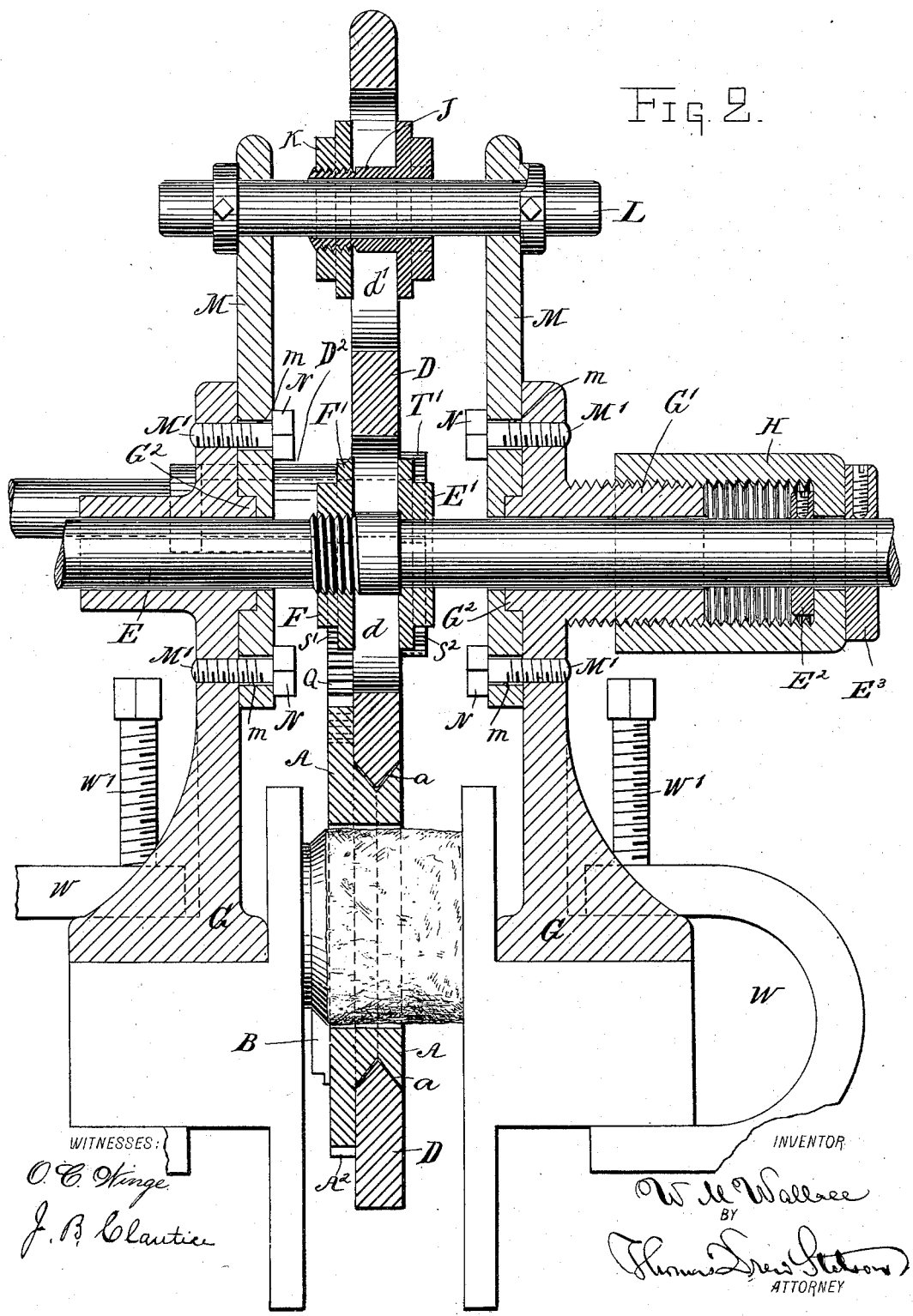

No. 609,060. Patented Aug. 16, 1898.
W. M. WALLACE.
PIN TURNING MACHINE.
(Application filed Jan. 25, 1898.)
(No Model.) 3 Sheets—Sheet 3.

WITNESSES:
O. C. Winge
J. B. Clautice

INVENTOR
W. M. Wallace
BY
Thomas Drew Stetson
ATTORNEY

THE NORRIS PETERS CO., PHOTO-LITHO., WASHINGTON, D. C.

UNITED STATES PATENT OFFICE.

WILLIAM MILO WALLACE, OF MARSHALLTOWN, IOWA, ASSIGNOR TO THE FISHER GOVERNOR COMPANY, OF SAME PLACE.

PIN-TURNING MACHINE.

SPECIFICATION forming part of Letters Patent No. 609,060, dated August 16, 1898.

Application filed January 25, 1898. Serial No. 667,863. (No model.)

*To all whom it may concern:*

Be it known that I, WILLIAM MILO WALLACE, a citizen of the United States, residing at Marshalltown, in the county of Marshall and State of Iowa, have invented a certain new and useful Improvement in Turning-Machines, of which the following is a specification.

My machine is adapted for turning cylindrical bearings in machinery. Cross-heads and analogous parts of mechanism having a cylindrical bearing forged or cast in one with a part on each side which forbids finishing in an ordinary lathe may be made with separately-formed pins driven through holes in such side parts; but the construction may be made lighter with a given strength if forged or otherwise produced with the pin or cylindrical bearing integral with such side parts. Thus in producing a cross-head the side parts, with their slides, and the central part at one end, with its provisions for engaging with the piston-rod, may be and have often been made integral with each other and with the cylindrical part, technically the "pin," which extends across between the jaws to form the bearing for the connecting-rod; but such construction has always involved difficulties and much labor with risk of imperfect work in finishing such bearing in place. My machine is adapted to finish that pin and the adjacent surfaces of such cross-heads with ease and great perfection.

I employ a small but efficient cutting-tool and provide for carrying it in the right position around the bearing, including its passage through the limited space in the cross-head, and I mount it with the required firmness in a ring formed in two parts and applied together around the rough pin and carry the tool around by revolving the ring. I hold this ring by the aid of a broad and relatively thin yoke, embracing it in a V-shaped groove therein. This yoke is also made in two pieces and applied together around the pin and ring, and I hold the yoke in supporting mechanism with capacity for adjustment. I provide means for strongly rotating the ring and feeding it laterally as it revolves. After one portion of the pin has been turned with the tool in position on one side of the ring I shift the tool to the other side of the ring or disconnect the ring and reverse its position, so that the tool shall come on the other side of the ring and operate in the opposite direction to turn the remaining portion of the pin.

I have more especially in view the turning of the pins and adjacent faces of cross-heads for steam-engines, pumps, and analogous machines and will describe it as thus applied. I may sometimes refer to it simply as a "cross-head" pin-turning-machine.

The facing attachment for finishing the inner face of the cross-head on each side is provided by a separate housing, which is held on the ring by two screws and has a star-feed for effecting the required feed radially.

The accompanying drawings form a part of this specification, and represent what I consider the best means of carrying out the invention.

Figure 5:
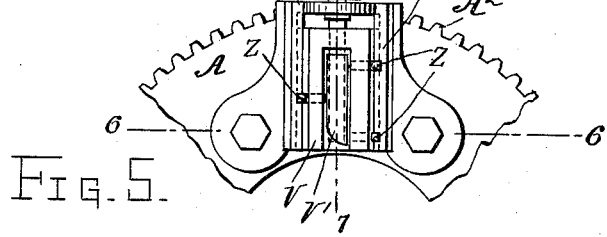
Figure 6:
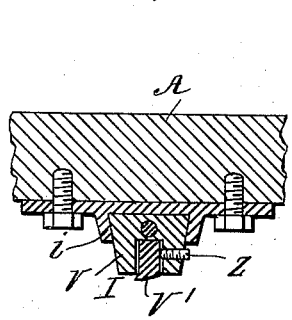
Figure 7:
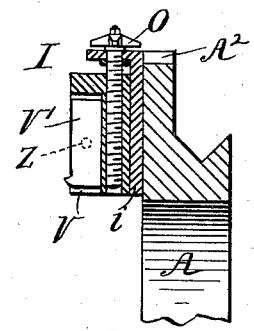

Figure 1 is a side elevation of the mechanism. Fig. 2 is a central section on the line 2 2 in Fig. 1. Fig. 3 is a section of a portion on the line 3 3 in Fig. 1. Fig. 4 is a plan view, partly in horizontal section, showing the machine adjusted for finishing the plane faces on the interior of the cross-head at each side. Figs. 5, 6, and 7 are details showing the provisions for effecting that operation. Fig. 5 is a face view of a portion of the ring with the housing containing the tool and feeding provision for the facing. Fig. 6 is a corresponding section on the line 6 6 in Fig. 5. Fig. 7 is a section in the plane 7 7 in Figs. 5 and 6.

Similar letters of reference indicate corresponding parts in all the figures where they appear.

A A are two semicircular parts constituting when properly united by studs A' (and keys fitting in transverse slots therein and in corresponding holes in the parts) a rigid ring having the required stability to properly support a cutting-tool B, having the form of a lathe-tool, but sufficiently short. The two parts of this ring are adapted to loosely embrace the unfinished pin of a cross-head and to be firmly united together and to the tool. On the exterior of the united parts constituting the ring A are the gear-teeth $A^2$, through which the strong rotary motion required may be communicated. In a parallel portion of the periphery of the ring is a V-shaped groove $a$, extending around and receiving the corresponding V-shaped inner edge of a yoke D, which is also formed in two parts to be applied and removed. These parts are held together by screws D'.

E is a horizontal bar having a portion of larger diameter and screw-threaded near the mid-length. A stout collar E', fixed thereon, presents a fair face against which the yoke is firmly clamped by the action of a nut F, fitting on the screw-threaded portion and exerting its pressure through a large washer F'. The bar E firmly supports the yoke D and its connected ring and tool.

G G are stands adapted to support the bar E, and thereby the entire mechanism, by being firmly clamped upon flat surfaces of the cross-head. W are the clamps employed for this purpose, operated by screws W'.

The bar E fits easily in bearings in the stands G and is adjusted axially by an internally-threaded screw-cap H, which is matched upon a correspondingly screw-threaded tube G', formed by an extension of the bearing on G, which supports the bar E. The latter is fitted with adjustable collars $E^2$ $E^3$, between which the cap H engages, as indicated. Turning this screw-threaded cap in one direction or the other correspondingly feeds the yoke D and its connections longitudinally of the pin to be turned.

The rigid connection of the yoke to the bar may be shifted up and down, so that while the bar is held at a uniform height above the plane surface on the cross-head the position of the accurately-finished cylindrical surface produced may be made higher or lower by simply adjusting the yoke up and down. A liberal slot $d$ is provided for that purpose.

To effect the adjustment of the path of the cutting-tool, and consequently of the axis of the pin which is produced, in the other direction horizontally toward and from the eye in Fig. 1, the yoke is swung by turning the bar E slightly in its bearings in the stands G. The proper turning and final firm holding is effected by the aid of an extension upward of the yoke D embracing a smooth cylindrical bar L, which is held firmly in a position parallel to the bar E and at such distance therefrom as gives an efficient leverage in holding the yoke. This bar is held firmly in extensions M, which are adjustably fixed on the stands G. The junction of these extensions M to the stands G are made through the intervention of bosses $G^2$ on the stands G and corresponding recesses in the extensions M, and they are held firmly in adjustment by means of bolts N, inserted through curved slots $m$ in the part M. The position of the circle traversed by the point of the cutting-tool may be shifted longitudinally of the cross-head by slackening the bolts N and changing the positions of the extensions M, so as to swing the yoke on the axis of the bar E as a center to a sufficient amount, and again tightening the bolts.

The provisions for giving the necessary strong but slow rotary motion to the ring A remains to be described. The yoke D has a lateral extension on one side, as indicated in Fig. 1. P is a shoulder-screw set firmly therein, forming a stud, on which freely revolves a gear-wheel Q, engaging the teeth $A^2$ of the ring A. A jam-nut P' may be applied on the projecting end of P to tighten the hold.

A short shaft R, carried in a bearing a proper distance farther out in the yoke D, carries gear-wheels S' $S^2$, keyed or otherwise rigidly set on the ends, respectively, one of which gears with the wheel Q. The gear-wheel on the other end of this short shaft receives motion from a gear-wheel T' on the shaft T, mounted in a long bearing $D^2$, provided in the yoke in the position represented. This gear-wheel T' engages with the adjacent gear-wheel S'. The shaft T may be turned by a belt and pulley. (Not represented.) I have shown it as provided with a crank $T^2$, adapted for operating the device by hand.

The parts may be made sufficiently rigid to operate in treating a wide range of sizes of pins and varying degrees of hardness of the metal.

The parallel bar L serves as a rigid brace to connect the two extension-pieces M of the standards firmly together and make them serve as a unit with the cross-head or other sufficiently heavy piece of machinery which is to be treated. It is lubricated and serves as a way on which the yoke D and its attachments may slide to one side and the other to the small extents required in feeding the cutting-tool to traverse something more than half the length of the pin. The bearing of the yoke on this bar is effected through a screw-threaded sleeve J, set in a slot $d'$ and confined by a nut K. The engagement of this sleeve and nut with the adjacent parts of the yoke is rigid, but the nicely-finished interior of the sleeve is free to slide from side to side on the correspondingly-finished surface of the bar L, as required.

To operate the machine, I adjust the yoke to bring the tool near one end of the pin and as the work proceeds gradually feed it laterally, turning the threaded cap H either constantly or by slight instalments. There may be automatic mechanism for effecting this, if desired. This action feeds the tool gradually to one side until it passes the mid-length of the pin, and a little more than one-half the length of the pin is turned.

To effect the turning of the other half, an extensive but simple change must be made. The work is stopped and the threaded cap H is turned to bring the tool back to the other end of the pin and the two parts of the ring A are separated. They are applied together in the reversed position and again firmly secured. Then the cutting-tool B may (without shifting its position except by the reversal of the ring described, bringing it to the opposite side thereof) be fed from such end position to the mid-length of the pin and feeding from there, thus finishing the other half of the length.

For finishing the inner faces of the cross-head I remove the tool B and bolt on the housing I. This has a radial way $i$, in which a slide V is guided, with provisions for feeding it outward. A proper cutting-tool V' is mounted in the slide or carriage V by means of headless screws Z. (See Fig. 6.) This housing, with its attachments, being firmly set on the ring A and adjusted, with the point of the cutting-tool V' at its innermost travel, the whole is by the lateral movement of the yoke adjusted into proper contact with the adjacent inner face of the cross-head, and the machine is set in motion. The feeding outward of the slide V and its firmly-held tool V' finishes the plane annular surface in the side cheek adjacent to the pin and is effected by the aid of a star-wheel O, having a screw-threaded connection with the slide arranged to strike by its spurs against a stationary tappet, (not shown,) all this latter in the well-known manner. The tool thus fed radially out can finish an annular surface adjacent to the pin. Then by readjusting the tool V' in the slide V or substituting a different tool having the cutting-point near the mid-length of the pin and again adjusting the parts a second treatment—feeding outward the slide again—will plane an annular area of similar breadth exterior to the first, and so on.

Finally, the yoke and ring are again separated and reversed in position and reapplied and secured. This brings the housing, with its connections, on the other side, and the operation is repeated, finishing a corresponding large plane area on the opposite inner face of the cross-head. The remaining portions of the inner faces of the cross-head, if any there be, which cannot be finished by this means, being properly finished by hand or by a slotting-machine or other ordinary tool, the work is complete.

It will be understood that in cases where the pin is forged or cast much too large or much is to be turned from the side faces the metal may be removed at two or more cuts instead of the single one described, also that in such cases the last cut may be made by a different tool, so as to give great smoothness to the surface.

My machine may be applied to re-dress the pins of cross-heads which have become injured either by long-continued wear or by abrasions in consequence of heating or other cause. It may be applied and worked successfully in thus re-dressing the pin of a locomotive cross-head without taking the cross-head out of its connection with the piston and guides.

The tube G' being a boss of considerable length, cast or forged integral with a stand G, performs the double function of affording a long support for the bar E, and thus very stiffly holding the yoke and guiding the attached ring A, revolving therein, to resist the tendency to deflection due to the resistance to the lateral feed of the tool and also presenting a long cylindrical surface to be threaded for attaining the feed by my simple screw-cap tapped therein.

I attach importance to the fact that in the frame proper of my machine the parts G are adapted to rest fairly on the cross-head or other article to be treated and that I provide separate clamps which are exchangeable without requiring any change of the other parts in adapting the machine to treat cross-heads or other devices of widely-varying thicknesses.

It will be understood that instead of starting the tool at the middle and feeding toward the ends in turning the pin and instead of starting the tool from the pin and feeding outward in turning the several annular instalments in plane-facing the ends—the inner faces of the cross-head—the feed may in each case be in the opposite direction.

Modifications may be made without departing from the principle or sacrificing the advantages of the invention. Additions may be made. I have shown the cutting-tool B held by a screw C, sunk into a longitudinal slot in the tool and adjustable endwise to the extent of the slot. Before the screw is completely tightened the tool may be forced inward with delicacy by any ordinary or suitable mechanism which will be sufficiently compact to apply in the limited space available.

I use the term "cross-head" to include the part so termed in a steam or gas engine, pump, or the like and also to include any piece of mechanism in which a pin and adjacent faces require to be finished which cannot be revolved in the ordinary manner in a lathe.

I claim as my invention—

1. In a machine for treating cross-heads, the ring A made in separable parts, with rigid connecting means, and with the tool B carried therein, in combination with the yoke D also made in separable parts embracing such ring and with provisions for moving the yoke with its connections to effect the feeding of the tool, and with provisions for carrying the tool on one of the faces of the ring allowing for finishing quite to the end of the pin by reversing the ring, and means as the shaft S, gears S', S², and changeable gear T, for communicating motion to the ring in either position, all arranged for joint operation substantially as herein specified.

2. In a machine for treating cross-heads, the ring A made in separable parts, with rigid connecting means and the tool B carried therein, in combination with the yoke D, also made in separable parts embracing such ring and with provisions for moving the yoke with its connections to effect the feeding of the tool, and means as the slots $d, d'$, and bolts therein for adjusting the yoke and ring vertically, all arranged for joint operation substantially as herein specified.

3. In a machine for treating cross-heads, the ring A made in separable parts, with rigid connecting means, and the tool B carried therein, in combination with the yoke D also made in separable parts embracing such ring, and with provisions for moving the yoke with its connections to effect the feeding of the tool, and means as the adjustable extensions M, holding means M', and curved slots $m$ for adjusting the ring horizontally, all arranged for joint operation substantially as herein specified.

4. In a machine for treating cross-heads, the ring A made in separable parts with rigid connecting devices and the tool B carried therein, in combination with the yoke D also made in separable parts embracing such ring and with provisions for moving the yoke with its connections to effect the feeding of the tool, means as the slots $d\ d'$, and bolts therein for adjusting the yoke and ring vertically, and means as the adjustable extensions M, holding devices M' and curved slots $m$, for adjusting the ring horizontally, all arranged for joint operation substantially as herein specified.

5. In a machine for treating cross-heads and analogous pieces of mechanism, having the supporting-yoke D and ring A, each made in separable parts, mechanism for revolving the latter, means as the slots $d\ d'$, and bolts therein for adjusting the yoke and ring vertically and means as the adjustable extensions M, holding devices M', and curved slots $m$ for adjusting the yoke and ring horizontally, the combination therewith of the housing I, the slide V, and provisions for holding the cutting-tool V' therein and for feeding the slide and its tool radially, adapted to finish the inner faces of the cross-head adjacent to the ends of the pin, and also of carrying a tool and feeding it across, adapted for finishing the pin, all substantially as herein specified.

In testimony that I claim the invention above set forth I affix my signature in presence of two witnesses.

WILLIAM MILO WALLACE.

Witnesses:
J. H. EGERMAYER,
W. T. BOARDMAN.

It is hereby certified that Letters Patent No. 609,060, granted August 16, 1898, upon the application of William Milo Wallace, of Marshalltown, Iowa, for an improvement in "Pin-Turning Machines," was erroneously issued to the Fisher Governor Company, as owner of the entire interest in said invention; whereas said Letters Patent should have been issued to the inventor *William Milo Wallace and the Fisher Governor Company, jointly*, the said Fisher Governor Company being the assignee of one-half interest only in said patent, as shown by the record of assignments in this office; and that the said Letters Patent should be read with this correction therein that the same may conform to the record of the case in the Patent Office.

Signed, countersigned, and sealed this 4th day of October, A. D., 1898.

[SEAL.]

THOS. RYAN,
*First Assistant Secretary of the Interior.*

Countersigned:

C. H. DUELL,
*Commissioner of Patents.*